United States Patent [19]

Grünberg et al.

[11] Patent Number: 4,523,253
[45] Date of Patent: Jun. 11, 1985

[54] ENCAPSULATED MEDIUM-VOLTAGE ELECTRICAL LOAD SWITCHING APPARATUS

[75] Inventors: Kurt Grünberg, Offenbach; Rainer Poth, Bad Vilbel; Peter Werner, Oberursel; Kurt Koch, Neu-Isenburg; Friedrich Schweppe, Eppertshausen; Kurt Voigtländer, Offenbach, all of Fed. Rep. of Germany

[73] Assignee: Siemens Aktiengesellschaft, Berlin and Munich, Fed. Rep. of Germany

[21] Appl. No.: 348,821

[22] Filed: Feb. 16, 1982

[30] Foreign Application Priority Data

Mar. 2, 1981 [DE] Fed. Rep. of Germany ....... 3107911

[51] Int. Cl.$^3$ ............................................. H02B 1/04
[52] U.S. Cl. ................................ 361/335; 200/148 F; 361/332
[58] Field of Search ............... 361/332, 333, 334, 335, 361/356, 357, 390, 396, 429, 431, 338, 347; 200/50 AA, 148 B, 148 F, 150 C; 174/17 GF

[56] References Cited

U.S. PATENT DOCUMENTS

| 2,594,075 | 4/1952 | Rugg | 361/335 |
| 3,889,083 | 6/1975 | Guaglione | 200/148 B |
| 4,357,508 | 11/1982 | Werner | 200/150 C |
| 4,417,111 | 11/1983 | Kishi et al. | 200/148 F |

FOREIGN PATENT DOCUMENTS

| 565261 | 6/1931 | Fed. Rep. of Germany | 361/332 |
| 409666 | 2/1945 | Italy | 361/335 |
| 940662 | 4/1956 | Netherlands | 361/334 |
| 1158892 | 7/1969 | United Kingdom | 361/335 |

Primary Examiner—A. D. Pellinen
Assistant Examiner—Gregory N. Thompson
Attorney, Agent, or Firm—F. W. Powers; J. L. James

[57] ABSTRACT

An encapsulated medium-voltage electrical load switching apparatus has four, three-position rotary switches, supported by pairs of opposing insulated half-shells, two-over-two in parallel alignment within a gas-filled sealed shut shell housing.

The housing front and back have dome-shaped protrusions to maintain the seal against fluctuations in gas pressure. Bushings in the floor and ceiling of the housing, aligned with the switch face plane, provide gastight connections between the switches and external cables, enclosed fuses and transformer terminals. Switch control is provided by drives mounted on a plate at the front of the housing exterior which operate actuator arms that extend in a gastight way through the housing front and manipulate selector shafts that connect to set the switches into closed-circuited, open-circuited and grounded positions. Internal conductors establish connection from a cable through a fuse to a transformer terminal when the two upper switches and one of the lower switches are closed-circuited.

The disclosed apparatus offers the advantages of low cost, compactness and freedom from maintenance.

15 Claims, 3 Drawing Figures

ENCAPSULATED MEDIUM-VOLTAGE ELECTRICAL LOAD SWITCHING APPARATUS

BACKGROUND OF THE INVENTION

1. Field of the Invention

This invention relates to an encapsulated medium-voltage electrical load switching apparatus.

2. Description of the Prior Art

Medium-voltage electrical switching installations exist which have an arrangement of switches mounted for operation within an electronegative gas-filled metal housing and gastight fittings connecting the switch arrangement with externally located cables, fuses and switch controls. An electronegative gas, such as sulfur hexafluoride is used to fill the housing. Other electronegative gases, which are commonly understood to be gases which are able to form negative ions by the application of an electron, can also be used. Because of the wide usage of such installations in power distribution systems, important desirable design objectives include low cost, compactness and minimum maintenance requirements. An example prior art mediumvoltage load switching apparatus directed at attaining maintenance-free operation over long periods of time, together with compactness and low manufacturing costs is disclosed in German Offenlegungsschrift DE-OS No. 27 29 571.

SUMMARY OF THE INVENTION

It is an object of the present invention to provide an improved medium-voltage electrical load switching apparatus which is maintenance-free, weatherproof, usable both indoors and outdoors, low cost and extremely compact, yet which can be readily inspected and has terminals which are easily accessible.

In one aspect of the present invention an encapsulated medium-voltage electrical load switching apparatus is provided having a switch arrangement of at least three rotary switches sealed against access within an electronegative gas-filled metal housing. The rotary switches have three switch positions (open-circuited, closed-circuited and grounded positions) and are aligned with their rotary axis parallel to one another. The switches are arranged in respective insulated housings which are filled with electronegative gas and configured to permit communication of the gas in the metal housing with the gas in the insulated housing. Gastight bushings are arranged side-by-side in the floor of the metal housing substantially in line with the plane of the front faces of the rotary switches for establishing connections between the switches and external circuitry. Further gastight bushings located in the ceiling of the metal housing provide access passages to establish connections between the switches and externally-positioned fuses and also between the switches and the terminals of a transformer branch. The details of a preferred embodiment of the invention are described below.

Switching apparatus in accordance with the invention is especially advantageous for distribution stations, for connecting and switching a ring cable field, and for connecting and switching a branch.

There have thus been outlined rather broadly certain objects, features and advantages of the invention in order that the detailed description that follows may be better understood, and in order that the present contribution to the art may be better appreciated. There are, of course, additional features of the invention that will be described more fully hereinafter. Those skilled in the art will appreciate that the conception on which this disclosure is based may readily be utilized as the basis for the designing of other arrangements for carrying out the purposes of this invention. It is important, therefore, that this disclosure be regarded as including all such equivalent arrangements and encompass the spirit and scope of the invention.

BRIEF DESCRIPTION OF THE DRAWINGS

An embodiment of the invention has been chosen for purpose of illustration and description, and is shown in the accompanying drawings forming a part of the specification, wherein.

Throughout the drawings, like elements are referred to by like numerals.

DESCRIPTION OF THE PREFERRED EMBODIMENT

Figure 1:
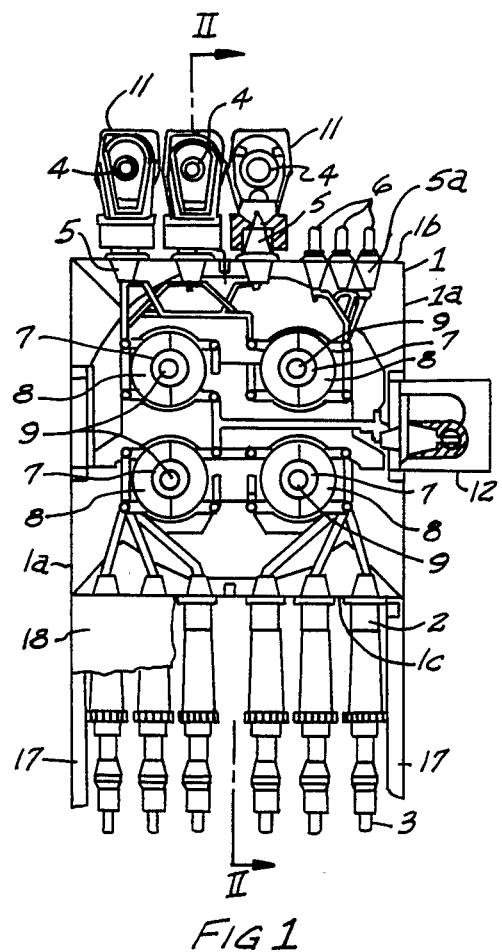
FIG. 1 is a schematic frontal view of a preferred embodiment of a electrical load switching apparatus according to the invention, shown in a section view in accordance with line I—I of FIG. 2.
Figure 2:
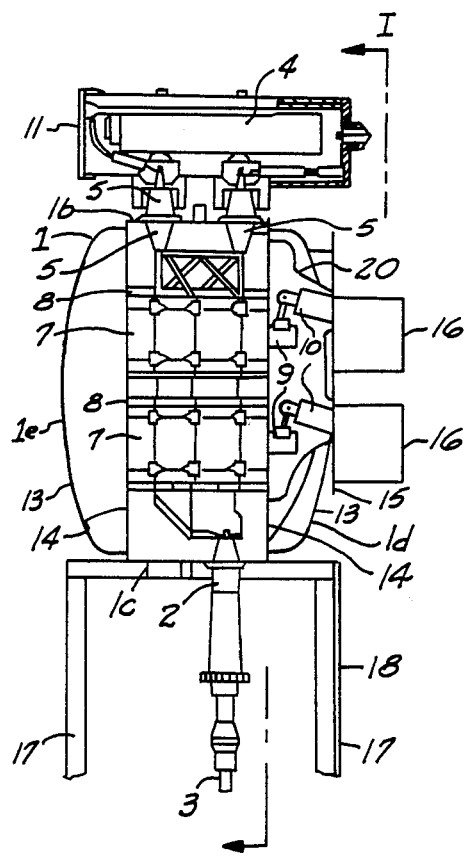
FIG. 2 is a schematic side sectional view of the apparatus of FIG. 1 taken along the line II—II of FIG. 1.

A preferred embodiment of encapsulated medium-voltage electric load switching apparatus, shown in FIGS. 1 and 2 comprises a switching arrangement sealed within an encapsulation in the form of a metal housing 1 which contains electronegative gas.

The metal housing 1, preferrably made of stainless steel, has a rectangular parallelepiped shape, with side walls 1a, ceiling 1b, floor 1c, and front wall 1d and rear wall 1e. External control of the switching arrangement is provided by a control mechanism which connects in a gastight way to the outside of the metal housing 1. Gastight bushings 2 provide access-passages into the housing for connecting cables 3 to the switching arrangement. An enclosed fuse system having three fuses 4 is mounted on top of the metal housing 1 and connected to the switching arrangement by means of access-passages provided by gastight bushings 5. Other gastight bushings 5a on the ceiling 1b of the metal housing 1 provide means for connecting the switching arrangement to a transformer branch 6. It is a characteristic feature of the metal housing 1 that it is sealed against access to its interior. This is done by welding all the way around the metal housing 1, after the switching arrangement and other internal elements have been installed.

Figure 3:
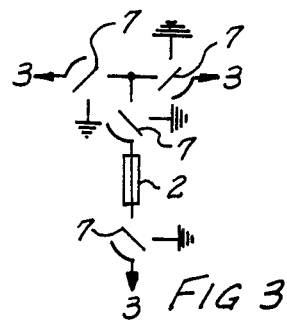
FIG. 3 is a circuit diagram of the electrical circuit defined by the apparatus of FIG. 1.

The switching arrangement encapsulated within the metal housing 1 comprises at least three rotary switches 7. The preferred embodiment, shown in FIGS. 1 and 2, has four such switches. The switches 7 are arranged to have the same orientation within the metal housing 1, with their rotational axes parallel to each other and parallel to the sides 1a, the ceiling 1b and the floor 1c of the metal housing 1. The rotary switches 7 can be set to any one of three switching positions: closed-circuited, open-circuited and grounded. The electrical connections between the several switches are shown in the circuit diagram FIG. 3.

Each of the rotary switches 7 is supported within the metal housing 1 in an insulated housing 8 consisting of two half-shells of insulating material. The insulated housings 8 contain electronegative gas and are configured to permit the contained gas to communicate with the other electronegative gas located in the metal housing 1. As shown in FIG. 2, the means for controlling the rotary switches 7 consists of a selector shaft 9 which is manipulated by an extension or actuator 10.

The bushings 2 which provide access-passages for connecting the cables 3 to the switching arrangement are arranged side-by-side on the floor 1c of the metal housing 1 in a line which runs parallel to the aligned front faces of the rotary switches 7.

The fuse device including the fuses 4 is positioned on the top of the ceiling 1b of the metal housing 1. The bushings 5 associated with the fuse device are secured on the ceiling 1b of the metal housing 1, arranged in two parallel rows of three bushings 5 each. The two rows of bushings 5 each extend parallel to the side-by-side row of bushings 2 positioned on the floor 1c of the metal housing 1.

The enclosure of the fuse device comprises three capsules 11 of insulating material, each associated with a respective fuse 4. Each insulating material capsule 11 is releasably mounted on a pair of opposed bushings 5, one of which is in each of the two rows.

The transformer branch 6 is also arranged in the ceiling 1b of the metal housing 1 and consists of three bushings 5a which provide gastight access-passages for connecting the switching arrangement to the terminals of a transformer.

An extension terminal 12 is provided on one of the side walls 1a of the metal housing 1 (FIG. 1).

It is important for the sealing of the metal housing 1, that the walls of the housing yield little, if at all, in response to pressure fluctuations of the contained electronegative gas. Such pressure fluctuations may be due to the effects of external and/or internal temperature influences. In order to be able to absorb such fluctuations in pressure without affecting the seal, the metal housing 1 is designed in a special way. The front and rear walls 1d and 1e (FIG. 2) which extend generally perpendicular to the rotational axes of the rotary switches 7 each are formed with a dome-like end portion 13 which protudes centrally out of the wall plane and resists flexing.

The dome-like end 13 arranged in the wall 1d in front of the faces of the rotary switches 7 is penetrated by the extension 10 associated with each of the selector shafts 9. Penetration is effected by means of outwardly-directed passages (not shown) disposed in the corresponding dome-like end 13.

In the illustrated example, the insulated housings 8 which support the rotary switches 7 extend between two support plates 14 which are anchored to the metal housing 1 and to which the end faces of the insulated housings 8 are secured.

To further reinforce the metal housing 1, reinforcing ribs (not shown) may be provided on the flat walls of the metal housing 1.

A plate 15 is arranged in front of the dome-like end 13 which is penetrated by the actuators 10 of the selector shafts 9. The plate 15 carries a drive 16 which controls the operation of each rotary switch 7. For greater clarity of illustration, only one drive 16 is shown in FIG. 2. The plate 15 is supported by suitable means such as spacer bolts which are secured to the domelike end 13 of the front wall 1d of the metal housing 1. The drives 16 may be spring assisted mechanisms or stored energy mechanisms.

In the illustrated example, the metal housing 1 is supported on a frame having four legs 17. At the front of the apparatus there is located a removable cover 18 which can be locked into, or unlocked from, its intended position depending on the positions of the rotary switches 7.

Having thus described the invention with particular reference to an example embodiment, it will be obvious to those skilled in the art to which the invention pertains, after understanding the invention, that various changes and modifications may be made therein without departing from the spirit and scope of the invention as defined by the claims appended hereto.

What is claimed is:

1. An encapsulated medium-voltage electrical load switching apparatus, comprising:

a generally rectangular parallelepiped-shaped metal housing having floor, ceiling, side, front and back walls, and being sealed against access from without;

a quantity of electronegative gas contained within the metal housing;

a switch arrangement, comprising at least three rotary switches oriented in the same direction within the metal housing with their rotary axes parallel to each other and extending between the front and back walls of the housing, the switches having front faces aligned in a vertical plane which is prependicular to the floor, ceiling and side walls, and each switch being able to be set to closed-circuited, open-circuited and grounded positions;

a plurality of insulated housings mounted within the metal housing, each insulated housing supporting a respective one of the switches, and each insulated housing containing a portion of the electronegative gas in a way which permits communication of the contained gas with the rest of the gas in the metal housing;

means, including a first plurality of gastight bushings arranged side-by-side in a row in the floor of the metal housing aligned with the reference plane and establishing electrical connections between the switches and external circuitry;

means, including a second plurality of gastight bushings arranged in pairs in two rows in the ceiling of the metal housing and establishing electrical connections between the switches and externally-positioned fuses connected across the pairs of bushings, the two rows being parallel to each other and also parallel to the row of the first plurality of bushings;

means, including a third plurality of gastight bushings arranged side-by-side in a row in the ceiling of the metal housing establishing electrical connections between the switches and the terminals of a transformer branch; and switch control means, actuating the switches in a gastight way, for control of the position setting of the switches from outside the metal housing.

2. Apparatus as defined in claim 1, wherein the metal housing is made of stainless steel.

3. Apparatus as defined in claim 1, further comprising an extension terminal provided on one of the side walls of the metal housing.

4. Apparatus as defined in claim 1, wherein the externally positioned fuses are releasably mounted on a different pair of the second plurality of bushings; and a capsule of insulating material encloses each fuse.

5. Apparatus as defined in claim 1, wherein the front and back walls of the metal housing are each formed with a dome-like end portion which protrudes centrally out of the wall plane and resists flexing.

6. Apparatus as defined in claim 1, wherein the switch control means comprises a selector shaft mounted in each insulated housing for setting the associated switch; and an actuator connecting to each selector shaft.

7. Apparatus as defined in claim 6, wherein each actuator extends in a gastight way through the front wall of the metal housing.

8. Apparatus as defined in claim 7, further comprising a plate supported externally of the metal housing on the front wall; and wherein the switch control means further comprises a plurality of drives carried on the plate and respectively connected to manipulate the actuators.

9. Apparatus as defined in claim 8, wherein some of the drives are spring assisted mechanisms and some of the drives are stored energy mechanisms.

10. Apparatus as defined in claim 7 or 8, wherein the front wall of the metal housing is formed with a dome-like end portion which protrudes centrally out of the wall plane and resists flexing, the end portion being configured with outwardly-directed passages through which the actuators extend.

11. Apparatus as defined in claim 1, further comprising a support plate anchored to the metal housing, and wherein the insulated housings have front ends jointly secured to the mounting plate.

12. Apparatus as defined in claim 1, further comprising a frame having four legs on which the metal housing is supported; and a cover removably secured to the legs in a position below the front wall of the metal housing to obstruct access to the externally exposed portions of the first plurality of bushings.

13. Apparatus as defined in claim 1 or 11, wherein the insulated housings each comprise two half-shells which cooperate to form a sleeve which encloses the associated switch and whose longitudinal axis coincides with the rotary axis of the switch.

14. An encapsulated medium-voltage electrical load switching apparatus, comprising:
a generally rectangular parallelepiped-shaped metal housing having floor, ceiling, front, back and two side walls; the metal housing being sealed against access from without, and the front and back walls each being formed with a dome-like end portion which protrudes centrally out of the wall plane and resists flexing;
a quantity of electronegative gas contained within the metal housing;
a switch arrangement, comprising four rotary switches oriented in the same direction, two-over-two, within the metal housing with their rotary axes parallel to each other and extending between the front and back walls of the housing, the switches having front faces aligned in a vertical plane which is perpendicular to the floor, ceiling and side walls, and each switch being able to be set to closed-cricuited, open-circuited and grounded postions;
four sleeve-shaped insulated housings mounted within the metal housing, each insulated housing providing support for a respective one of the switches, each insulated housing being oriented with its longitudinal axis coincident with the rotary axis of the associated switch, and each being configured to contain a portion of the electronegative gas in a way which permits communication of the contained gas with the rest of the gas in the metal housing;
means, including gastight first bushings arranged side-by-side in a row in the floor of the metal housing aligned with the reference plane, for establishing electrical connections between the switches and external circuitry;
three fuses;
three capsules of insulating material, each enclosing a respective one of the fuses;
means, including six gastight second bushings arranged in pairs in two rows in the ceiling of the metal housing establishing electrical connections between the switches and the fuses which are externally-positioned connected across a different pair of the second bushings, the two rows being parallel to each other and also parallel to the row of the first bushings;
means, including three gastight third bushings arranged side-by-side in a row in the ceiling of the metal housing establishing electrical connections between the switches and the terminals of a transformer branch;
a plate supported externally of the metal housing on the front wall thereof; and
switch control means for control of the position setting of the switches from outside the metal housing, comprising a selector shaft mounted in each insulated housing for setting the associated switch; an actuator connecting to each selector shaft and extending in a gastight way through the end portion of the front wall of the metal housing;
and at least two drives carried on the plate and respectively connected to manipulate the actuators.

15. An encapsulated medium-voltage electrical load switching apparatus, comprising:
a generally rectangular parallelepiped-shaped metal housing having floor, ceiling, side, front and back walls, and being sealed against access from without;
a quantity of electronegative gas contained within the metal housing;
a switch arrangement, comprising at least three rotary switches oriented in the same direction within the metal housing with their rotary axes parallel to each other and parallel to the floor, ceiling and side walls, the switches having front faces aligned in a reference plane which is perpendicular to the floor, ceiling and side walls, and each switch being able to be set to closed-circuited, open-circuited and grounded positions;
a plurality of insulated housing mounted within the metal housing, each insulated housing supporting a respective one of the switches, and each insulated housing containing a portion of the electronegative gas in a way which permits communication of the contained gas with the rest of the gas in the metal housing;
means, including a first plurality of gastight bushings arranged side-by-side in a row in the floor of the metal housing aligned with the reference plane, establishing electrical connections between the switches and external circuitry;
means, including a second plurality of gastight bushings arranged in pairs in two rows in the ceiling of the metal housing, establishing electrical connections between the switches and externally-positioned fuses connected across the pairs of bushings, the two rows being parallel to each other and also parallel to the row of the first plurality of bushings;

means, including a third plurality of gastight bushings arranged side-by-side in a row in the ceiling of the metal housing, establishing electrical connections between the switches and the terminals of a transformer branch; and switch control means, actuating the switches in a gastight way, for control of the position setting of the switches from outside the metal housing.

* * * * *